US012625254B2

(12) United States Patent
Dore et al.

(10) Patent No.: US 12,625,254 B2
(45) Date of Patent: May 12, 2026

(54) GEORADAR IMAGING METHOD AND ASSOCIATED GEORADAR

(71) Applicant: COMMISSARIAT À L'ÉNERGIE ATOMIQUE ET AUX ÉNERGIES ALTERNATIVES, Paris (FR)

(72) Inventors: Jean-Baptiste Dore, Grenoble (FR); Raffaele D'Errico, Grenoble (FR); Luc Maret, Grenoble (FR)

(73) Assignee: COMMISSARIAT À L'ENERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 358 days.

(21) Appl. No.: 18/573,104

(22) PCT Filed: Jun. 23, 2022

(86) PCT No.: PCT/FR2022/051242
§ 371 (c)(1),
(2) Date: Apr. 9, 2024

(87) PCT Pub. No.: WO2022/269203
PCT Pub. Date: Dec. 29, 2022

(65) Prior Publication Data
US 2024/0288573 A1 Aug. 29, 2024

(30) Foreign Application Priority Data

Jun. 24, 2021 (FR) ....................................... 2106797

(51) Int. Cl.
*G01S 13/88* (2006.01)
*G01S 7/41* (2006.01)
*G01S 13/00* (2006.01)
(52) U.S. Cl.
CPC ............. *G01S 13/885* (2013.01); *G01S 7/411* (2013.01); *G01S 13/003* (2013.01)

(58) Field of Classification Search
USPC ........................................................... 342/22
See application file for complete search history.

(56) References Cited

U.S. PATENT DOCUMENTS

| | | | | |
|---|---|---|---|---|
| 5,339,080 A | * | 8/1994 | Steinway | G01S 13/0209 |
| | | | | 342/25 R |
| 6,002,357 A | * | 12/1999 | Redfern | G01S 13/88 |
| | | | | 342/126 |

(Continued)

OTHER PUBLICATIONS

International Search Report for PCT/FR2022/051242 dated Oct. 18, 2022.

(Continued)

*Primary Examiner* — Bernarr E Gregory
(74) *Attorney, Agent, or Firm* — McDonald Hopkins LLC

(57) ABSTRACT

A method for imaging an area of interest on the ground uses a georadar equipped with a plurality of transmitter antennas and a plurality of receiver antennas. A bistatic RCS matrix is calculated at each point of a grid based on the matrix representing the MIMO channel modelling the propagation and the reflection in the area of interest, a matrix representing the losses along the propagation paths of the channel, and a phase-shifter matrix representing the delays on these same propagation paths. The bistatic RCS matrices relating to discrete frequencies belonging to the same coherence sub-band are summed and the elements of the matrices thus obtained are then summed incoherently to provide an overall backscatter coefficient for each point of the grid. Afterwards, an image representing this backscatter coefficient at each point of the grid is generated. A method for detecting a ground target-uses the same principle.

10 Claims, 4 Drawing Sheets

(56)            References Cited

U.S. PATENT DOCUMENTS

| 9,395,437 | B2 * | 7/2016 | Ton | ..................... | G01S 13/0209 |
| 9,870,641 | B2 * | 1/2018 | Anderson | ............. | G01S 13/003 |
| 2016/0286519 | A1 * | 9/2016 | Tzur | ......................... | G01S 5/06 |

OTHER PUBLICATIONS

Written Opinion for PCT/FR2022/051242 dated Oct. 18, 2022.
Tian Jin et al, "Extraction of Landmine Features Using a Forward-Looking Ground-Penetrating Radar With MIMO Array", IEEE Transactions on Geoscience and Remote Sensing, IEEE, USA, vol. 50, No. 10, Oct. 1, 2012 (Oct. 1, 2012), p. 4135-4144.
Sun Meng et al, "Advanced Signal Processing Methods for Ground-Penetrating Radar: Applications to civil engineering", Jul. 1, 2019 (Jul. 1, 2019), vol. 36, No. 4, p. 74-84.

* cited by examiner

GEORADAR IMAGING METHOD AND ASSOCIATED GEORADAR

CROSS-REFERENCE TO RELATED APPLICATIONS

This is a National Stage application of PCT international application PCT/FR2022/051242, filed on Jun. 23, 2022, which claims the priority of French Patent Application No. 2106797, filed Jun. 24, 2021, both of which are incorporated herein by reference in their entirety.

TECHNICAL FIELD

The present invention relates to the field of ground penetration radars also called geological radars or georadars, and more particularly that of ground imaging by such radars.

PRIOR ART

Georadars are commonly used in demining and detection of buried networks. The evolution of regulations in some European countries aims to reinforce the obligation to detect the buried networks when requesting authorisation for works or to map sensitive networks in urban areas.

Different methods for georadar ground imaging are known from the prior art. In general, they consist in transmitting a radar signal into the ground by means of a transmitter antenna in several successive positions, or from a plurality of transmitter antennas, and in receiving the reflected signal by means of an antenna in several successive positions or several receiver antennas. Afterwards, the received signals are subjected to a so-called focusing or migration processing intended to perform position or phase shifts on the signals reflected by different objects in the ground. For example, the migration techniques used in this processing include Kirchhoff migration and F-k migration a description of which will be found in the article by N Smitha et al. entitled "K Kirchhoff and F-k migration to focus penetrating radar images" published in Int'l Journal of Geo-Engineering, Vol. 7, No. 4, April. 2016.

Nonetheless, these migration imaging methods have some drawbacks. First of all, these are sensitive to couplings whether to couplings between the antennas or to couplings between the antennas and the ground. Besides, they do not allow easily resolving several layers of objects in the ground. For example, if networks are buried at different depths, that one buried deeply will be masked by that one which is close to the surface of the ground. Finally, they require a uniform meshing of the area of interest, which is sometimes useless.

A first object of the present invention is to provide a ground imaging method by georadar which does not have the aforementioned drawbacks and which in particular allows avoiding the coupling effects as well as solving layers of buried objects at different depths. A second object of the present invention is to detect the presence and to locate objects present in the ground with a lower false alarm rate than in the prior art.

DISCLOSURE OF THE INVENTION

The present invention is defined by a method for georadar imaging of an area of interest on the ground, said georadar operating in an analysis spectral band and being equipped with a plurality N of transmitter antennas as well as a plurality M of receiver antennas, said imaging method comprising:

meshing of said area of interest on the ground by a grid of points and decomposition of the analysis spectral band into a plurality Q of coherence sub-bands, each sub-band ($B_q$) comprising a set of discrete frequencies;

calculation, for each point of the grid and each discrete frequency, of a matrix of losses $A(p_k, f, L)$ representing the attenuation of the signal transmitted by each transmitter antenna, having propagated to said point and then received by each receiver antenna;

calculation, for each point of the grid and each discrete frequency, of a matrix of phasors, $U(p_k, f, L)$, each phasor corresponding to a propagation delay of the signal transmitted by each transmitter antenna, having propagated to said point and then received by each receiver antenna;

estimation, for each discrete frequency, of the matrix, $H(f)$, of the multiple in multiple out (MIMO) channel representing the N transmitter antennas, the area of interest on the ground and the M receiver antennas;

estimation by channel equalisation of a bistatic radar cross section (RCS) matrix, $\hat{\Gamma}(p_k, f)$, for each point of the grid and each discrete frequency from the MIMO channel matrix for this frequency as well as the matrix of losses and the matrix of phasors, for this point of the grid and this frequency;

coherent summation, over the discrete frequencies of each coherence sub-band, of the bistatic RCS matrices relating to a point of the grid, the coherent summation being performed for each coherence sub-band and each point of the grid so as to obtain a sub-band bistatic RCS matrix $\hat{\Gamma}(p_k, B_q)$ at each point of the grid;

incoherent summation, over the different coherence sub-bands, of the elements of the sub-band RCS matrices, to obtain an overall backscatter coefficient at each point of the grid;

generation of the image of the area of interest by representing the overall backscatter coefficient at each point of the grid.

The equalisation used to estimate the RCS matrix could be a ZF-type equalisation, an maximum mean square error (MMSE) type equalisation or an maximum combining ratio (MRC) type equalisation.

Advantageously, the signal transmitted in each coherence sub-band will be an orthogonal frequency-division multiplexing (OFDM) signal, the channel estimation in the discrete frequencies of this sub-band being carried out by means of pilot symbols modulating the sub-carriers of this signal.

Advantageously, the coherence bandwidth is selected smaller than or equal to the coherence bandwidth of the RCS of a predetermined target.

The matrix of losses $A(p_k, f, L)$ is typically calculated by $A(p_k, f, L) = G_T(p_k, f) \odot G_R(p_k, f) \odot B(p_k, f, L)$ where $G_T(p_k, f)$ is a gain of the transmitter antenna in the direction where it sees the point of the grid, $G_R(p_k, f)$ is the gain of the receiver antenna in the direction where it sees the point of the grid and $B(p_k, f, L)$ models the losses in the medium, and $\odot$ is Hadamard product.

Said overall backscatter coefficient at the point of the grid $p_k$ may be calculated by $$\hat{\gamma}(p_k) = \sum_{q=1}^{Q} \sum_{j=1}^{M} \sum_{i=1}^{N} |\hat{\Gamma}_{i,j}(p_k, B_q)|^2$$

3 where $\hat{\Gamma}_{i,j}(p_k, B_q)$ is the complex coefficient of the bistatic RCS for the coherence sub-band $B_q$ and Q is the number of coherence sub-bands in the analysis spectral band.

The invention also relates to a method for detecting a target on the ground by means of a georadar, said georadar operating in an analysis spectral band and being equipped with a plurality N of transmitter antennas as well as a plurality M of receiver antennas, said target detection method comprising:

selection of a point of interest $(p_k)$ on the ground and decomposition of the analysis spectral band into a plurality Q of coherence sub-bands, each sub-band $(B_q)$ comprising a set of discrete frequencies;

calculation, for each point of the grid and each discrete frequency, of a matrix of losses $A(p_k, f, L)$ representing the attenuation of the signal transmitted by each transmitter antenna, having propagated to said point and then received by each receiver antenna;

calculation, for said point of interest and each discrete frequency, of a matrix of phasors, $U(p_k, f, L)$, each phasor corresponding to a propagation delay of the signal transmitted by each transmitter antenna, having propagated to said point and then received by each receiver antenna;

estimation, for each discrete frequency, of the matrix, H(f), of the MIMO channel representing the N transmitter antennas, the point of interest on the ground and the M receiver antennas;

estimation by channel equalisation of a bistatic RCS matrix, $\hat{\Gamma}(p_k, f)$, for the point of interest and each discrete frequency from the MIMO channel matrix for this frequency as well as the matrix of losses and the matrix of phasors, for this point of interest and this frequency;

coherent summation, over the discrete frequencies of each coherence sub-band, of the bistatic RCS matrices, the coherent summation being performed for each coherence sub-band so as to obtain a sub-band bistatic RCS matrix $\hat{\Gamma}(p_k, B_q)$ for said point of interest;

incoherent summation, over the different coherence sub-bands, of the elements of the sub-band RCS matrices, to obtain an overall backscatter coefficient at said point of interest;

comparison of said overall backscatter coefficient with a predetermined threshold value, a target being detected at the point of interest if the overall backscatter coefficient is higher than the threshold value, and not being detected otherwise.

The equalisation used to estimate the RCS matrix could be a zero forcing (ZF) type equalisation, an MMSE-type equalisation or an MRC-type equalisation.

Advantageously, the signal transmitted in each coherence sub-band is an OFDM signal, the channel estimation in the discrete frequencies of this sub-band being carried out by means of pilot symbols modulating the sub-carriers of this signal.

Said overall backscatter coefficient at the point of the grid $p_k$ may be calculated by $$\hat{\gamma}(p_k) = \sum_{q=1}^{Q} \sum_{j=1}^{M} \sum_{i=1}^{N} |\hat{\Gamma}_{i,j}(p_k, B_q)|^2$$

where $\hat{\Gamma}_{i,j}(p_k, B_q)$ is the complex coefficient of the bistatic RCS for the coherence sub-band $B_q$ and Q is the number of coherence sub-bands in the analysis spectral band.

4

BRIEF DESCRIPTION OF THE DRAWINGS

Other features and advantages of the invention will become apparent upon reading a preferred embodiment of the invention, described with reference to the appended figures, wherein.

DETAILED DISCLOSURE OF PARTICULAR EMBODIMENTS

Figure 1:
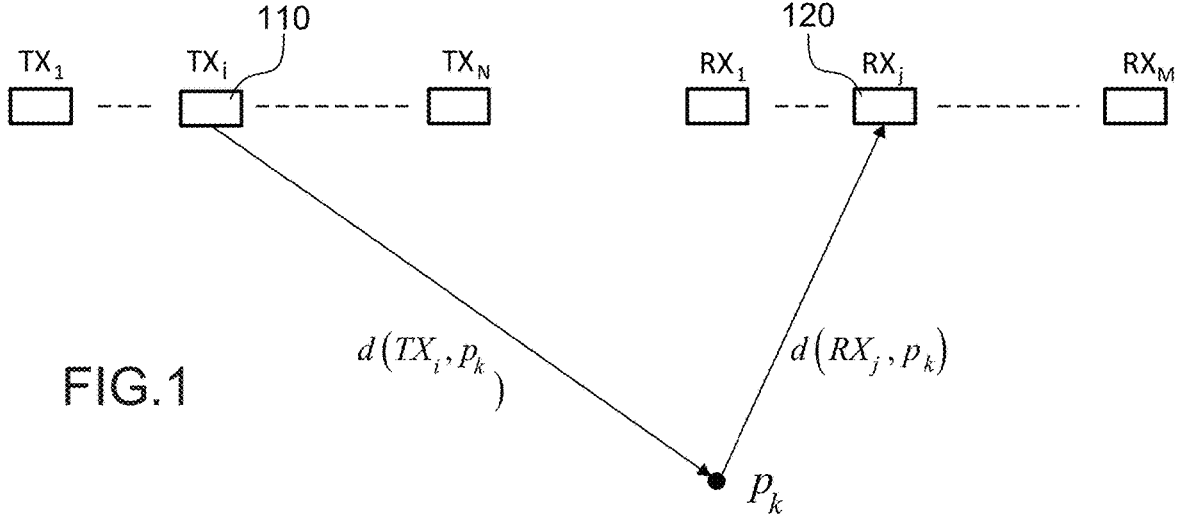
FIG. 1 schematically shows an antenna configuration that can be used in a georadar system.

Next, we will consider a georadar allowing imaging an area of interest on the ground. In its simplest version, this georadar includes one single transmitter antenna and one single receiver antenna. The transmitter antenna could then successively take on a plurality N of possible positions at the surface of the ground. Similarly, the receiver antenna could successively take on a plurality M of possible positions at the surface of the ground. Thus, the georadar can acquire a set N×M of signals transmitted by the transmitter antenna in said N possible positions, reflected by the buried structure and received by the receiver antenna in each of its M possible positions. Alternatively, as shown in FIG. 1, the georadar could comprise an array of N transmitter antennas, 110, and/or an array of M receiver antennas, 120. Thus, for example, each of the N transmitter antennas $TX_1, \ldots, TX_N$ could transmit emit a signal in turn and the signals received by the M receiver antennas $RX_1, \ldots, RX_M$ could be acquired simultaneously. Still alternatively, the georadar could comprise one single transmitter antenna able to successively take on N possible positions and transmitting a signal at each of these positions, as well as an array of M receiver antennas to simultaneously acquire the signals received in the M reception positions. For example, the possible positions in emission and/or in reception could be equidistributed along an axis (linear array) or two axes (matrix array). Different configurations could be considered by a person skilled in the art depending on the type of desired representation of the area of interest (2D vertical cut or B-scan, 3D or C-scan representation).

Without loss of generality, it will be assumed hereafter that the transmitter antenna is a (linear) array antenna including N elementary antennas 110 and that the receiver antenna is a (linear) array antenna including M elementary antennas 120. The two array antennas may be combined using a duplexer to multiplex the transmission and the reception, in a manner known per se.

It is assumed that a target is present at the point $p_k$, a signal transmitted by the transmitter antenna $TX_i$ of the georadar is reflected (backscattered) by the target located at the point $p_k$ and the signal thus reflected is received by each of the receiver antennas $TX_i$.

The system formed by the array of transmitter antennas, the ground, the target at the point $p_k$ and the receiver antenna array may be assimilated to a MIMO (Multiple In Multiple Out) transmission/reception system. Such a system is characterised by its N×M sizes channel matrix, denoted H($p_k$, f, L) where $p_k$={$x_k$, $y_k$, $z_k$} represents the coordinates of the reflecting target and f is the frequency of the transmitted signal. This channel matrix may be decomposed in the following form:

$$H(p_k, f, L) = \Gamma(p_k, f) \odot A(p_k, f, L) \odot U(p_k, f, L) \qquad (1)$$

where $\odot$ represents Hadamard product, $\Gamma(p_k, f)$ is a N×M sized matrix representing the RCS (Radar Cross Section) of the target, therefore not depending on the characteristics of the ground, U($p_k$, f, L) is a N×M sized unitary matrix whose elements are phasors representing the delays over the different elementary paths of the MIMO channel and A($p_k$, f, L) is a N×M sized real matrix representing the losses over the different elementary paths of this channel. The matrix A($p_k$, f, L) integrates in particular the gains of the transmitter and receiver antennas as well as the attenuation effects on the ground. L represents the attenuation coefficient in the medium of the ground herein assumed to be homogeneous.

More specifically, the matrix of losses A($p_k$, f, L) may be expressed as follows:

$$A(p_k, f, L) = G_T(p_k, f) \odot G_R(p_k, f) \odot B(p_k, f, L) \qquad (2)$$

where $G_T(p_k, f)$ models the gain diagram of the elementary transmitter antenna in the directions $\overline{TX_i p_k}$, i=1, ..., N, $G_R(p_k, f)$ models a gain diagram of the elementary receiver antenna in the directions $\overline{p_k RX_j}$, j=1, ..., M models the losses in the medium. The elements of the matrix B($p_k$, f, L) are given by:

$$B_{i,j}(p_k, f, L) = \frac{v}{4\pi f d_{\Pi}^{i,j}(p_k)} \exp\left(-\frac{2\pi f d_{\Sigma}^{i,j}(p_k)}{v\sqrt{2}} \sqrt{\sqrt{1+L^2}-1}\right)$$

where v is the propagation speed of the electromagnetic waves in the medium of the ground;

$$d_{\Pi}^{i,j}(p_k) = d(TX_i, p_k) \cdot d(RX_j, p_k)$$

is the product of the distances between the elementary transmitter antenna $TX_i$ and the target, on the one hand, and between the receiver antenna $RX_j$ and the target, on the other hand;

$$d_{\Sigma}^{i,j}(p_k) = d(TX_i, p_k) + d(RX_j, p_k)$$

is the sum of these same distances.

In turn, the matrix of phasors representing the delays of propagation along the different paths of the MIMO channel, U($p_k$, f, L), is defined by the elements:

$$U_{i,j}(p_k, f, L) = \exp\left(2\pi j \frac{f d_{\Sigma}^{i,j}(p_k)}{v\sqrt{2}} \sqrt{\sqrt{1+L^2}+1}\right) \qquad (4)$$

with the same notations as before.

A first idea at the basis of the invention is to consider the detection of the target at the point $p_k$ as a problem of detection of an information symbol, herein the complex coefficients of bistatic RCS, in Gaussian additive white noise.

In the absence of an echogenic element (target) at the point $p_k$, the channel matrix, H(f), is reduced to a noise matrix. On the other hand, in the presence of a target at this same point, the channel matrix may be expressed in the following form:

$$H(f) = \Gamma(p_k, f) \odot W(p_k, f, L) + n(f) \qquad (5)$$

where W($p_k$, f, L)=A($p_k$, f, L)$\odot$U($p_k$, f, L) and n(f) Gaussian white noise matrix.

The bistatic RCS matrix of the target may be estimated by a known equalisation process such as ZF (Zero Forcing), MMSE (Minimum Mean Square Error) or MRC (Maximum Combining Ratio):

$$\hat{\Gamma}_{ZF}(p_k, f) = H(f) \odot W*(p_k, f, L) \odot |W(p_k, f, L)|^{-2} \qquad (6\text{-}1)$$

$$\hat{\Gamma}_{MMSE}(p_k, f) = H(f) \odot W*(p_k, f, L) \odot \left(|W(p_k, f, L)|^2 + \sigma^2\right)^{-1} \qquad (6\text{-}2)$$

$$\hat{\Gamma}_{MRC}(p_k, f) = H(f) \odot W*(p_k, f, L) \qquad (6\text{-}3)$$

where $\sigma^2$ is the power of the noise, assumed to be identical over all of the elementary paths of the transmission channel.

When a target is present at the point $p_k$, the bistatic RCS matrices have a correlation for two close frequencies. In general, it is possible to define a coherence bandwidth $B_{coh}$, over which the phase of the bistatic RCS evolves slightly with the frequency. By slight evolution, it could be considered that the maximum phase variation of an element of the bistatic RCS over the coherence band is lower than a threshold equal to a fraction of $\pi$, for example lower than $\pi/2$.

The analysis spectral band may be divided into elementary sub-bands with a width smaller than or equal to $B_{coh}$. These elementary bands are denoted hereafter $B_q$, q=1, ..., Q. It should be noted that the coherence bandwidth of the bistatic RCS generally decreases with the frequency. Thus, the analysis spectral band could be divided into wide elementary sub-bands in the lower part of the spectrum and into narrower elementary bands in the upper part. Each elementary band $B_q$ is discretised and the set of the discrete values of $B_q$ is denoted $F_q$. The set of the discrete frequency values in the analysis spectral band is denoted $$F = \bigcup_{q=1}^{Q} F_q.$$

After having summed up each element of the bistatic RCS matrix over each elementary band, a bistatic RCS matrix for each elementary band is obtained. This bistatic RCS matrix will be noted $\hat{\Gamma}(p_k, B_q)$, in other words $\hat{\Gamma}(p_k, B_q)=\Sigma_{f \in F}\hat{\Gamma}(p_k, f)$.

Afterwards, it is possible to incoherently sum up the different elements of this bistatic RCS matrix for each band, for example by summing up their quadratic modules, to obtain an average RCS over all of the illumination and reception directions, namely:

$$\hat{\gamma}(p_k, B_q) = \sum_{j=1}^{M} \sum_{i=1}^{N} |W_{i,j}(p_k, f, L)|^2 \qquad (7)$$

and, finally, summing the results thus obtained over all of the elementary sub-bands:

$$\hat{\gamma}(p_k) = \sum_{q=1}^{Q} \hat{\gamma}(p_k, B_q) \qquad (8)$$

so as to obtain an overall backscatter coefficient of the target at the point $p_k$ over the entire analysis spectral band.

In the case of an MRC type estimation, it could be advantageous, according to one variant, to normalise the overall backscatter coefficient at each point by applying a gain compensating for the anisotropy of the gain diagram of the antennas as well as losses in the medium:

$$\hat{\gamma}_{MRC}^{norm}(p_k) = \frac{\hat{\gamma}_{MRC}(p_k)}{\sum_{i=1}^{N} \sum_{j=1}^{M} \sum_{f \in F} |W_{i,j}(p_k, f, L)|^2} \qquad (9\text{-}1)$$

or $$\hat{\gamma}_{MRC}^{norm}(p_k) = \frac{\hat{\gamma}_{MRC}(p_k)}{\sum_{i=1}^{N} \sum_{j=1}^{M} \sum_{f \in F} |A_{i,j}(p_k, f, L)|^2} \qquad (9\text{-}2)$$

with $\hat{\gamma}_{MRC}(p_k) = \sum_{j=1}^{M} \sum_{i=1}^{N} \sum_{q=1}^{Q} |\hat{\Gamma}_{MRC_{i,j}}(p_k, B_q)|^2$.

The equalisation estimation method disclosed hereinabove relates to the case of an echogenic target located at a point $p_k$. When several targets are present on the ground, the equalisation makes the RCS values of the different targets incoherent, in other words the contribution of a target located in $p_{k'} \neq p_k$ to the estimated value $\hat{\Gamma}(p_k, f)$ may be legitimately neglected. This property is to be assimilated to equalisation in a transmission channel allowing reducing the intersymbol interference.

Regardless of the estimation method used and its variants, an image of the ground area of interest can be obtained by controlling this area by an array of points and by representing, at each point, the overall backscatter coefficient, where appropriate, normalised.

According to a second embodiment of the invention, it is possible to simply determine whether a target is present at a point or in a given region of the area of interest. In this case, a comparison of the overall backscatter coefficient at this point, or an average of the coefficient over the considered region, could be performed with regards to a predetermined threshold value.

If the overall backscatter coefficient at this point (or the average of this coefficient over the region) is higher than the threshold value, it could be concluded on the presence of a buried target (for example a pipe) at this same point (or in this region).

Figure 2:
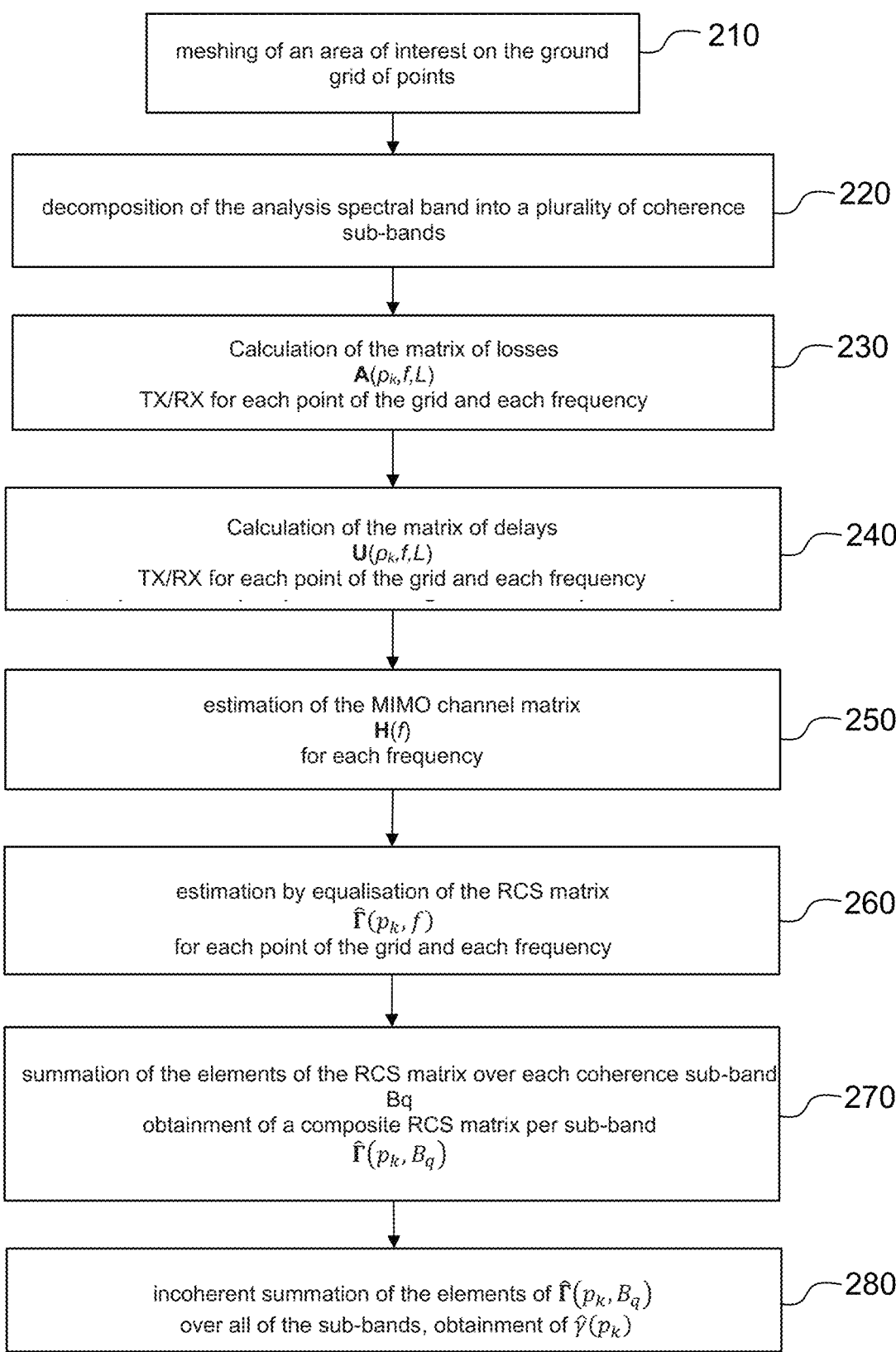
FIG. 2 schematically shows a ground imaging method by georadar according to an embodiment of the invention.

FIG. 2 schematically represents a for ground imaging method by georadar according to an embodiment of the invention.

In a first step, 210, an area of interest of the ground is defined and this area is meshed by an array of points, for example a grid of equidistributed points. As the case may be, the area could be one-dimensional (scan A), two-dimensional (scan B) or three-dimensional (scan C).

In a second step, 220, the analysis spectral band, B, is decomposed into a plurality of elementary sub-bands $B_q$, $q=1, \ldots, Q$ not necessarily disjoint, such that $$B = \bigcup_{q=1}^{Q} B_q.$$

Each elementary band $B_q$ is discretised and the set of discrete values of $B_q$ is denoted $F_q$. The set of the frequency discrete values in the analysis spectral band is noted $$F = \bigcup_{q=1}^{Q} F_q.$$

Based on a model of the ground and the gain diagram of the antenna (in transmission and in reception), the matrix of losses $A(p_k, f, L)$ is calculated in step 230 for each point $p_k$ of the grid and each frequency f of F. The ground model may be simply described by an attenuation coefficient L if the medium is homogeneous. Alternatively, the ground model could be more complex and comprise for example several layers of different thicknesses $e_1, \ldots, e_P$, each layer being characterised by its own attenuation coefficient $L_1, \ldots, L_P$. In general, the attenuation between the transmitter antenna and the point $p_k$ of the grid could be calculated by integration of an attenuation coefficient along the forward propagation path and the attenuation between this point and the receiver antenna could be the same so as to be calculated by integration of the attenuation coefficient along the backward propagation path.

In step 240, the matrix of phasors, $U(p_k, f, L)$, is calculated for each point $p_k$ of the grid and each frequency of F. If the propagation speed is not homogeneous, it could be taken into account through an integration calculation of this speed along the forward propagation path and of the backward propagation path.

In step 250, the MIMO channel matrix, H(f), is estimated by successively transmitting a pilot signal at the frequency $f \in F$ by each of the elementary transmitter antennas (or by one single transmitter antenna successively occupying different positions) and by carrying out the acquisition of the signals received by the different receiver antennas (or by one single receiver antenna successively occupying different positions). Advantageously, the channel estimation will be carried out by means of an OFDM (Orthogonal Frequency-Division Multiplexing) signal, each sub-carrier being modulated by a pilot symbol. Where appropriate, the channel estimation will be performed using an OFDM signal for each coherence band, $B_q$, $q=1, \ldots, Q$, the sub-carrier interval frequency which could differ according to the size of the band. Thus, the same number of sub-carriers for each elementary sub-band could be provided for even though the elementary sub-bands have different sizes. Nonetheless, it is clear that waveforms other than those of an OFDM signal could be used for the channel estimation.

It should also be noted that the order of steps 230, 240 and 250 is different.

In step 260, the bistatic RCS matrix is estimated at each frequency $f \in F$ by performing a channel equalisation, for example by means of a ZF, MMSE or MRC equalisation method, as described with reference to the expressions (6-1) to (6-3), or $\hat{\Gamma}(p_k, f)$.

Afterwards, in 270, for each point of the grid, a coherent summation of the bistatic RCS matrices is performed on each elementary sub-band, a sub-band RCS matrix is thus obtained, namely $\hat{\Gamma}(p_k, B_q) = \Sigma_{f \in F_q} \hat{\Gamma}(p_k, f)$.

Finally, in 280, an incoherent summation of the elements of the matrices $\hat{\Gamma}(p_k, B_q)$ is performed over all of the sub-bands, for example, according to the expressions (7) and (8) to obtain the overall backscatter coefficient $\hat{\gamma}(p_k)$ at each of the points $p_k$.

An image of the area of interest of the ground may be obtained by representing the overall backscatter coefficient, where appropriate normalised, at each point of the grid.

According to another embodiment of the invention, as described before, it is possible to perform a simple detection at a point of interest or in an area of interest by comparing the overall backscatter coefficient, possibly averaged over the area of interest, with a predetermined threshold value. This value may be determined experimentally based on targets of interest.

Figure 3:
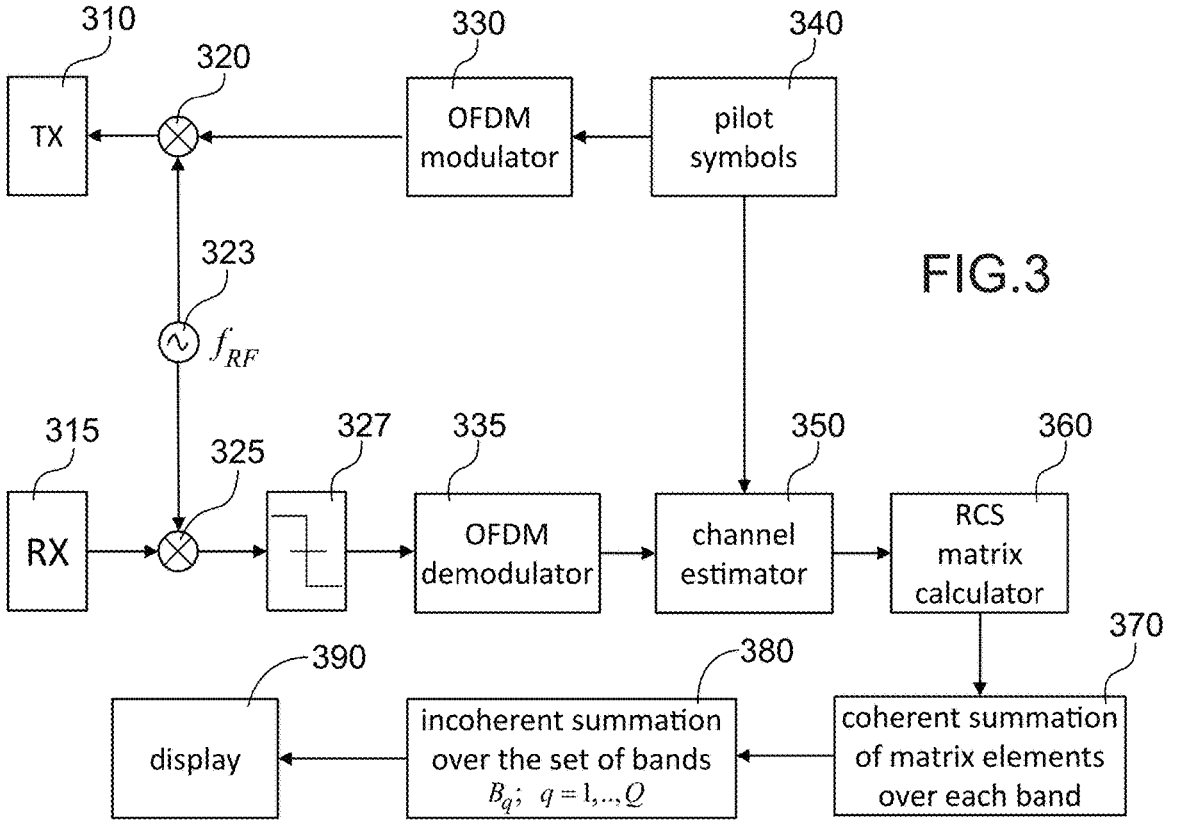
FIG. 3 schematically shows a ground imaging system by georadar according to an embodiment of the invention.

FIG. 3 schematically shows a ground imaging system by georadar according to an embodiment of the invention.

The system herein comprises an array of transmitter antennas 310. Each of the elementary antennas of the array 310 is selected in turn to transmit an OFDM signal in each of the bands $B_q$. The sub-carriers of the OFDM signal are modulated by the OFDM modulator with a set of pilot symbols 340. Afterwards, the OFDM signal is transposed into an RF band by means of a mixer 320 receiving an RF frequency generated by the generator 323. The RF clock may be controlled to transpose the OFDM signal into each of the bands $B_q$.

The system further comprises an array of receiver antennas 315. The acquisition of the signal received by each elementary antenna of the array may be carried out in parallel over M channels (comprising elements 325, 327 and 335), only one of which has been illustrated here. The received signal is translated into a baseband by means of the mixer 325 receiving the RF frequency. The translated signal is filtered by means of a low-pass filter 327 and then demodulated in the OFDM demodulator 335. The channel estimator 350 estimates the MIMO channel matrix, H(f), for the different frequencies of the sub-carriers within the elementary band $B_q$.

The calculation module 360 performs an estimation of the bistatic RCS matrix, $\Gamma(p_k, f)$, based on the channel matrix, H(f), the matrix $W(p_k, f, L)$ and, where appropriate, the noise power according to one of the expressions (6-1) to (6-3), at each point $p_k$ of the grid and for each frequency of $B_q$ and each elementary sub-band $B_q$, q=1, ..., Q.

The matrix sum module 370 performs the coherent summation of the bistatic RCS matrices over the different frequencies of the elementary sub-band, $B_q$, the operation being for each elementary sub-band $B_q$, q=1, ..., Q.

Afterwards, the sum module 380 performs the incoherent summation of the elements of each RCS matrix $\hat{\Gamma}(p_k, B_q)$, for example over all of the sub-bands, according to the expressions (7) and (8) in order to obtain the overall backscatter coefficient $\hat{\gamma}(p_k)$ at each of the points $p_k$.

The mapping of the backscatter coefficient $\hat{\gamma}(p_k)$ in the area of interest allows generating an image on the display module 390.

Figure 4:
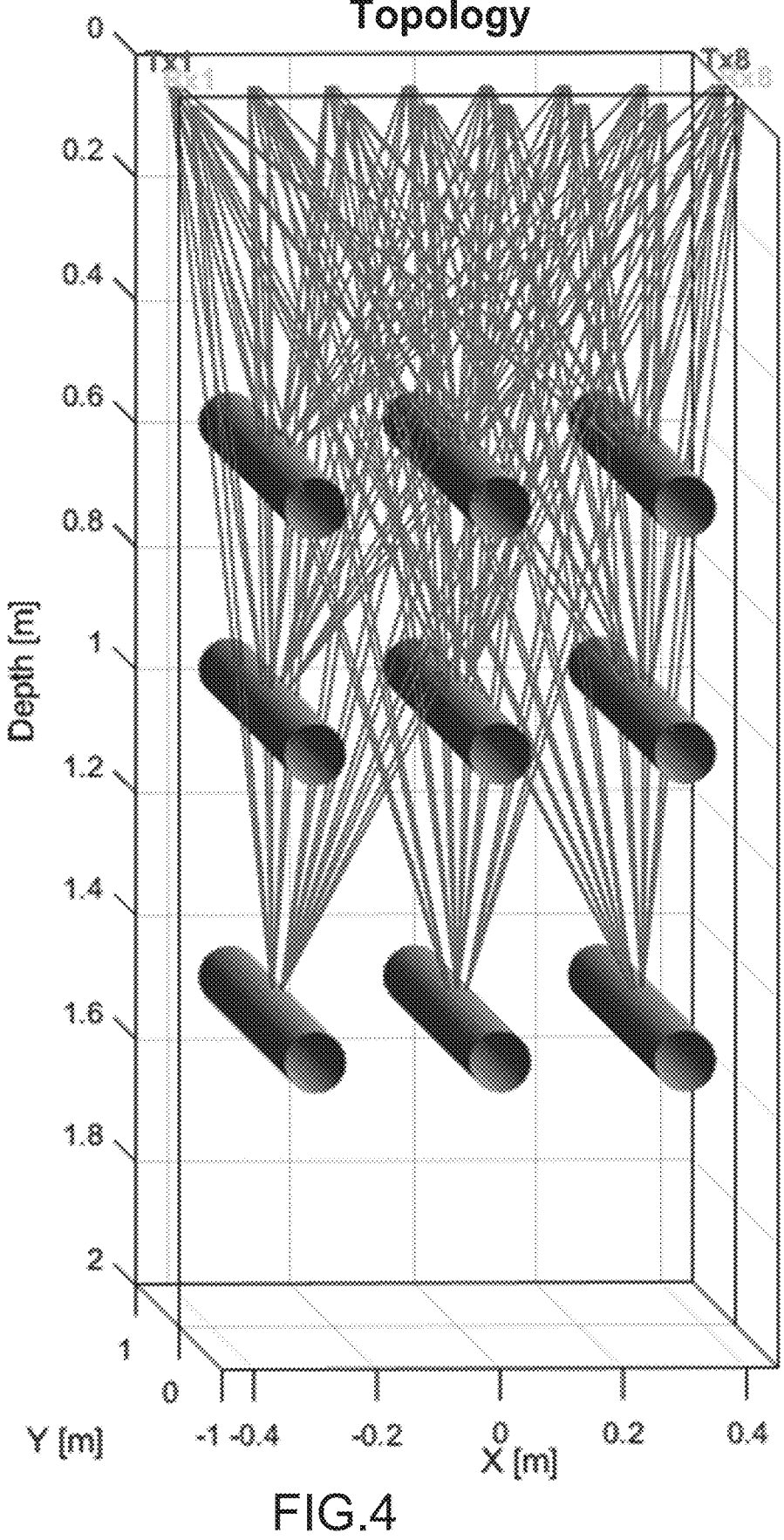
FIG. 4 shows a ground phantom used to validate the georadar imaging method of FIG. 2.

According to a variant that is not shown, the backscatter coefficient $\hat{\gamma}(p_k)$ is not used to generate an image but is compared with a predetermined threshold value to detect the presence of an echogenic target at the point $p_k$. FIG. 4 shows a ground phantom used to validate the georadar imaging method of FIG. 2.

This phantom comprises a medium attenuating the electromagnetic waves in the analysis spectral band in which 9 reflective pipes are located arranged according to 3 rows at different depths.

The georadar used for imaging comprises 8 transmitter antennas and 8 receiver antennas, which are assumed to be omnidirectional. The polarisation of the transmitted signal is herein selected perpendicular to the pipes.

Figure 5A:
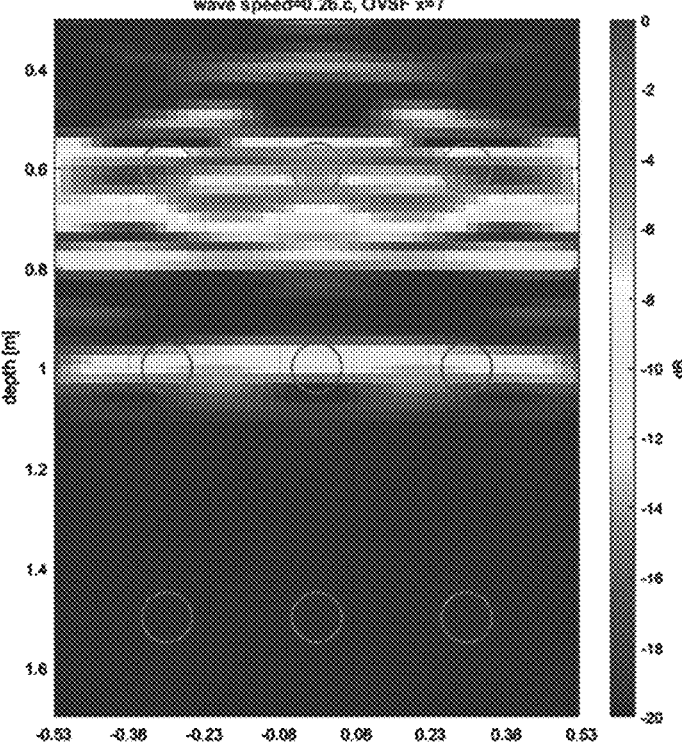
FIGS. 5A and 5B respectively show an image of the ground phantom of FIG. 4 obtained with an imaging method according to the prior art and an imaging method according to an embodiment of the invention.
Figure 5B:
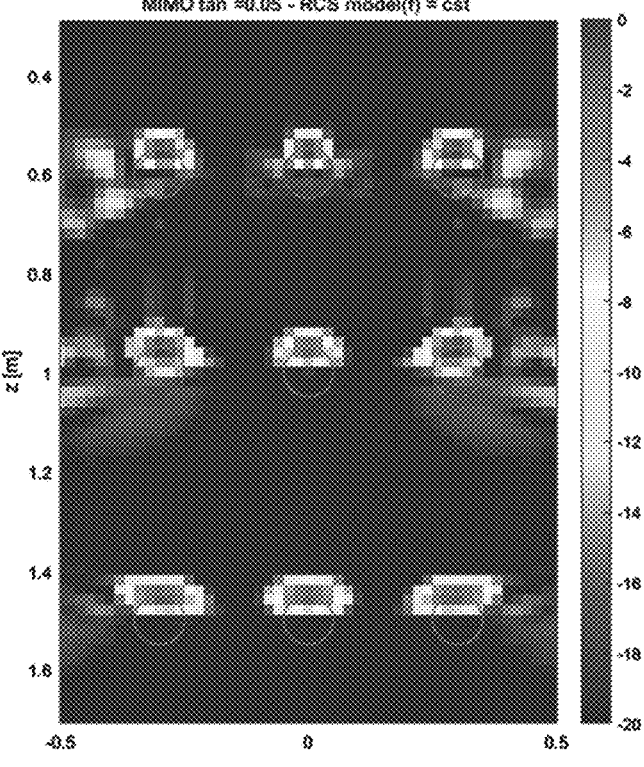

FIGS. 5A and 5B respectively show an image of the ground phantom of FIG. 4 obtained with an imaging method according to the prior art and an imaging method according to an embodiment of the invention.

The imaging method used in FIG. 5A is based on F-k migration as described in the introductory part. The acquisition is carried out by successively transmitting, by each transmitter antenna and by receiving by the associated receiver antenna (8 SISO system).

The imaging method used in FIG. 5B is that of the present invention using an 8×8 MIMO channel.

It should be noticed that in the first image, the pipes of the first row are detectable, but their positions are not resolved. On the other hand, the pipes of the next rows are not detectable.

In the second image, the pipes of each row are detectable and their positions are correctly resolved.

What is claimed is:

1. A method for georadar imaging of an area of interest on the ground, the georadar operating in an analysis spectral band and being equipped with a plurality N of transmitter antennas as well as a plurality M of receiver antennas, the method comprising:

meshing of the area of interest on the ground by a grid of points and decomposition of the analysis spectral band into a plurality Q of coherence sub-bands, each sub-band ($B_q$) comprising a set of discrete frequencies;

calculation, for each point of the grid and each discrete frequency, of a matrix of losses $A(p_k, f, L)$ representing the attenuation of the signal transmitted by each transmitter antenna, having propagated to said point and then received by each receiver antenna;

calculation, for each point of the grid and each discrete frequency, of a matrix of phasors, $U(p_k, f, L)$, each phasor corresponding to a propagation delay of the signal transmitted by each transmitter antenna, having propagated to said point and then received by each receiver antenna;

estimation, for each discrete frequency, of the matrix, H(f), of the multiple in multiple out (MIMO) channel representing the N transmitter antennas, the area of interest on the ground and the M receiver antennas;

estimation by channel equalisation of a bistatic radar cross section (RCS) matrix, $\hat{\Gamma}(p_k, f)$, for each point of the grid and each discrete frequency from the MIMO channel matrix for this frequency as well as the matrix of losses and the matrix of phasors, for this point of the grid and this frequency;

coherent summation, over the discrete frequencies of each coherence sub-band, of the bistatic RCS matrices relating to a point of the grid, the coherent summation being performed for each coherence sub-band and each point of the grid so as to obtain a sub-band bistatic RCS matrix $\hat{\Gamma}(p_k, B_q)$ at each point of the grid;

incoherent summation, over the different coherence sub-bands, of the elements of the sub-band RCS matrices, to obtain an overall backscatter coefficient at each point of the grid;

generation of the image of the area of interest by representing the overall backscatter coefficient at each point of the grid.

2. The georadar imaging method according to claim 1, wherein the equalisation used to estimate the RCS matrix is a zero forcing (ZF) equalisation, an minimum mean square error (MMSE) type equalisation or an maximum combining ratio (MRC) type equalisation.

3. The georadar imaging method according to claim 1, wherein the signal transmitted in each coherence sub-band is an OFDM signal, the channel estimation in the discrete frequencies of this sub-band being carried out by means of pilot symbols modulating the sub-carriers of this signal.

4. The georadar imaging method according to claim 1, wherein the coherence bandwidth is selected smaller than or equal to the coherence bandwidth of the RCS of a predetermined target.

5. The georadar imaging method according to claim 1, wherein the matrix of losses $A(p_k, f, L)$ is calculated by $A(p_k, f, L)=G_T(p_k, f)\odot G_R(p_k, f)\odot B(p_k, f, L)$ where $G_T(p_k, f)$ is a gain of the transmitter antenna in the direction where it sees the point of the grid, $G_R(p_k, f)$ is the gain of the receiver antenna in he direction where it sees the point of the grid and $B(p_k, f, L)$ models the losses in the medium, and $\odot$ is Hadamard product.

6. The georadar imaging method according to claim 1, wherein said overall backscatter coefficient at the point of the grid $p_k$ is calculated by $$\hat{\gamma}(p_k) = \sum_{q=1}^{Q} \sum_{j=1}^{M} \sum_{i=1}^{N} |\hat{\Gamma}_{i,j}(p_k, B_q)|^2$$

where $\hat{\Gamma}_{i,j}(p_k, B_q)$ is the complex coefficient of the bistatic RCS for the coherence sub-band $B_q$ and Q is the number of coherence sub-bands in the analysis spectral band.

7. A method for detecting a target on the ground by means of a georadar, said georadar operating in an analysis spectral band and being equipped with a plurality N of transmitter antennas as well as a plurality M of receiver antennas, further comprising:

selection of a point of interest $(p_k)$ on the ground and decomposition of the analysis spectral band into a plurality Q of coherence sub-bands, each sub-band $(B_q)$ comprising a set of discrete frequencies;

calculation, for each point of the grid and each discrete frequency, of a matrix of losses $A(p_k, f, L)$ representing the attenuation of the signal transmitted by each transmitter antenna, having propagated to said point and then received by each receiver antenna;

calculation, for said point of interest and each discrete frequency, of a matrix of phasors, $U(p_k, f, L)$, each phasor corresponding to a propagation delay of the signal transmitted by each transmitter antenna, having propagated to said point and then received by each receiver antenna;

estimation, for each discrete frequency, of the matrix, $H(f)$, of the multiple in multiple out (MIMO) channel representing the N transmitter antennas, the point of interest on the ground and the M receiver antennas;

estimation by channel equalisation of a bistatic radar cross section (RCS) matrix, $\hat{\Gamma}(p_k, f)$, for the point of interest and each discrete frequency from the MIMO channel matrix for this frequency as well as the matrix of losses and the matrix of phasors, for this point of interest and this frequency;

coherent summation, over the discrete frequencies of each coherence sub-band, of the bistatic RCS matrices, the coherent summation being performed for each coherence sub-band so as to obtain a sub-band bistatic RCS matrix $\hat{\Gamma}(p_k, B_q)$ for said point of interest;

incoherent summation, over the different coherence subbands, of the elements of the sub-band RCS matrices, to obtain an overall backscatter coefficient at said point of interest;

comparison of said overall backscatter coefficient with a predetermined threshold value, a target being detected at the point of interest if the overall backscatter coefficient is higher than the threshold value, and not being detected otherwise.

8. The method for detecting a ground target by means of a georadar according to claim 7, wherein the equalisation used to estimate the RCS matrix is a zero forcing (ZF) type equalisation, an minimum mean square error (MMSE) type equalisation or an maximum combining ratio (MRC) type equalisation.

9. The method for detecting a ground target by means of a georadar according to claim 7, wherein the signal transmitted in each coherence sub-band is an orthogonal frequency-division multiplexing (OFDM) signal, the channel estimation in the discrete frequencies of this sub-band being carried out by means of pilot symbols modulating the sub-carriers of this signal.

10. The method for detecting a ground target by means of a georadar according to claim 7, wherein said overall backscatter coefficient at the point of the grid $p_k$ is calculated by $$\hat{\gamma}(p_k) = \sum_{q=1}^{Q} \sum_{j=1}^{M} \sum_{i=1}^{N} |\hat{\Gamma}_{i,j}(p_k, B_q)|^2$$

where $\hat{\Gamma}(p_k, B_q)$ is the complex coefficient of the bistatic RCS for the coherence sub-band $B_q$ and Q is the number of coherence sub-bands in the analysis spectral band.

* * * * *